US009020463B2

(12) United States Patent
Kandregula

(10) Patent No.: US 9,020,463 B2
(45) Date of Patent: Apr. 28, 2015

(54) SYSTEMS, METHODS, APPARATUS, AND ARTICLES OF MANUFACTURE TO MEASURE MOBILE DEVICE USAGE

(75) Inventor: Anil Kandregula, Richardson, TX (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 29 days.

(21) Appl. No.: 13/340,053

(22) Filed: Dec. 29, 2011

(65) Prior Publication Data

US 2013/0171960 A1 Jul. 4, 2013

(51) Int. Cl.
*G06F 11/30* (2006.01)
*H04W 4/26* (2009.01)

(52) U.S. Cl.
CPC .............. *G06F 11/3072* (2013.01); *H04W 4/26* (2013.01); *G06F 11/3013* (2013.01)

(58) Field of Classification Search
CPC ....... H04W 4/26; H04W 88/04; H04W 12/08; H04W 12/00
USPC ................................................ 455/405–408
See application file for complete search history.

(56) References Cited

U.S. PATENT DOCUMENTS

| | | | |
|---|---|---|---|
| 5,418,837 A | | 5/1995 | Johansson et al. |
| 5,524,135 A | | 6/1996 | Mizikovsky et al. |
| 5,696,566 A | | 12/1997 | Kim et al. |
| 5,706,333 A | | 1/1998 | Grenning et al. |
| 5,805,666 A | | 9/1998 | Ishizuka et al. |
| 5,845,194 A | | 12/1998 | Seki et al. |
| 5,850,562 A | | 12/1998 | Crump et al. |
| 6,175,838 B1 | * | 1/2001 | Papierniak et al. ............ 707/752 |
| 6,256,774 B1 | * | 7/2001 | O'Leary et al. ................ 717/120 |
| 6,377,983 B1 | * | 4/2002 | Cohen et al. ................... 709/217 |
| 6,754,470 B2 | * | 6/2004 | Hendrickson et al. ...... 455/67.11 |
| 6,910,159 B2 | | 6/2005 | Phillips et al. |
| 7,464,122 B1 | * | 12/2008 | Basko et al. ........................... 1/1 |
| 7,574,661 B2 | * | 8/2009 | Matsuura et al. .............. 715/745 |
| 7,617,423 B2 | * | 11/2009 | Patel et al. ....................... 714/55 |
| 7,734,945 B1 | * | 6/2010 | Levidow et al. ................. 714/3 |
| 7,886,047 B1 | * | 2/2011 | Potluri ........................... 709/224 |
| 7,913,194 B1 | * | 3/2011 | Baylor ........................... 716/122 |
| 7,945,556 B1 | * | 5/2011 | Barnes et al. .................. 707/710 |
| 8,125,332 B2 | * | 2/2012 | Curran et al. ............. 340/539.13 |
| 8,135,735 B2 | * | 3/2012 | Johnson et al. ............... 707/769 |
| 8,180,333 B1 | * | 5/2012 | Wells et al. .................... 455/415 |
| 8,205,258 B1 | * | 6/2012 | Chang et al. ..................... 726/22 |
| 8,327,189 B1 | * | 12/2012 | Glade et al. ..................... 714/26 |

(Continued)

OTHER PUBLICATIONS

Pils et al., "Debugging of Mobile Agents in Wireless Communication Systems", Ninth International Conference on Computer Communications and Networks, IEEE, Oct. 16, 2000, pp. 649-652, (4 pages).

(Continued)

*Primary Examiner* — Mehmood B Khan
(74) *Attorney, Agent, or Firm* — Hanley, Flight & Zimmerman, LLC

(57) ABSTRACT

Systems, methods, apparatus, and articles of manufacture to measure mobile device usage are disclosed. An example method to determine mobile device usage includes filtering, with a processor, a debug log file stored in the device to obtain debug file entries representative of device usage information, the debug log file having been modified by at least one of an operating system of the device or a device application, and sending, to a server, a filtered log file based on filtering the debug log file.

23 Claims, 9 Drawing Sheets

(56) References Cited

U.S. PATENT DOCUMENTS

| | | | |
|---|---|---|---|
| 8,340,633 B1* | 12/2012 | Rege et al. | 455/406 |
| 8,375,350 B1* | 2/2013 | Richter et al. | 716/136 |
| 8,391,835 B1* | 3/2013 | Lubart et al. | 455/408 |
| 2001/0049263 A1 | 12/2001 | Zhang | |
| 2003/0055666 A1 | 3/2003 | Roddy et al. | |
| 2003/0069998 A1* | 4/2003 | Brown et al. | 709/310 |
| 2003/0126613 A1* | 7/2003 | McGuire | 725/109 |
| 2004/0239713 A1* | 12/2004 | Kang | 347/19 |
| 2005/0070259 A1* | 3/2005 | Kloba et al. | 455/414.2 |
| 2005/0120273 A1* | 6/2005 | Hudson et al. | 714/38 |
| 2005/0193036 A1* | 9/2005 | Phillips et al. | 707/202 |
| 2007/0011040 A1* | 1/2007 | Wright et al. | 705/10 |
| 2007/0058643 A1* | 3/2007 | Perley et al. | 370/401 |
| 2007/0180206 A1* | 8/2007 | Craft et al. | 711/162 |
| 2007/0288603 A1* | 12/2007 | Onslow | 709/219 |
| 2007/0300265 A1* | 12/2007 | Karkkainen | 725/62 |
| 2008/0274716 A1* | 11/2008 | Fok et al. | 455/410 |
| 2009/0119513 A1* | 5/2009 | Chung | 713/187 |
| 2009/0138763 A1* | 5/2009 | Arnold | 714/45 |
| 2009/0259745 A1* | 10/2009 | Lee | 709/224 |
| 2009/0282036 A1* | 11/2009 | Fedtke | 707/6 |
| 2009/0298514 A1* | 12/2009 | Ullah | 455/456.5 |
| 2010/0095157 A1* | 4/2010 | Aoyama et al. | 714/37 |
| 2011/0225459 A1* | 9/2011 | Fahrig et al. | 714/37 |
| 2011/0230229 A1* | 9/2011 | Das et al. | 455/550.1 |
| 2012/0110027 A1* | 5/2012 | Falcon | 707/802 |
| 2012/0173713 A1* | 7/2012 | Wang et al. | 709/224 |
| 2012/0197909 A1* | 8/2012 | Beel et al. | 707/749 |
| 2013/0061210 A1* | 3/2013 | Chung et al. | 717/125 |
| 2013/0072150 A1* | 3/2013 | Williamson et al. | 455/405 |
| 2014/0357312 A1* | 12/2014 | Davis et al. | 455/550.1 |

OTHER PUBLICATIONS

Branson et al., "Wireless Devices: Handling Power Efficiency and Debugging", Circuit Cellar, Issue 124, Nov. 2000, pp. 12-19, (7 pages).

Kranzlmuller et al., "Ubiquitous Parallel Program Observation and Analysis with DEWIZ", International Conference on Architecture of Computing Systems, Trends in Network and Pervasive Computing, Apr. 8, 2002, pp. 197-202, (6 pages).

* cited by examiner

400

402

404 — [Online Video/Audio URLs/URIs] ⸺ 406

05-26 18:43:29.991: INFO/MediaPlayer(3731): uri is: http:// ⸺ 408
v21.lscache5.googlevideo.com/
videoplayback?app=youtube_gdata&client=mvapp-android-
verizon&devKey=ATEU_r3RX2afGwq_gCqiS2UO88HsQjpE1a8d1GxQnGDm
&el=standard&expire=1309045275&id=72889325bafd9b4e&ip=0.0.0.0&ipbits=
0&itag=18&key=yta1&signature=8FA065AC595B07B60722686BC0D8C20730
29EA5F.7C2224F5D5E3D7ACD2DBA67BF3724A1FF9BAF4A8&sparams=id,i
tag,uaopt,ip,ipbits,expire&uaopt=no-save

[Netflix Movies] ⸺ 412   ⸺ 414   ⸺ 410

416 — 07-21 11:09:34.563: DEBUG/nf-player(4483): Asset received, start playing
Asset [nflx=nflx://www.netflix.com/
WiPlayer?trkid=3450286&movieid=70116690trkid=3450286&movieid=701166
90&title=Toy%20Story%203&watched_date=0&playback_bookmark=0&fb_don
tsharebtn=false&ncts=CLOUD, shopperId=, shopperSecret=,
netflixId=v%3D2%26ct%3DBQAOAAEBELsNvjAIDkPFcJ10WHA5CXuBADPO
l6ttggEcpiJKAUoI0YRWG5PrYjw_l4lQsK2fujEYDn7IkDsM-
D8qy7QTX6DpVtdKQSFFbpkF8WHWclP2Juptn7S-
5QIL7_TDR_fZ1XWqdTLNGU4KI-N4Yxog92qB6TuY0YKdNso9-
7cvAYldExU1GrHTLbjT7D769ehqsr2dOZiTWCCfFQEawvZdZqNtKQwiMfwoC
S6xV_ywPQXAK9_1yYgLS-kvgvGi_9c4cjdK9Onht8tlqMo5zKd4_m-
AJCeZd3UoZF3fuCmaHizFGucErJiUGsGl7bpybwADCuJqHTeLa5GeYpDhTZ
baTHbckvQt8oGDmgK9ghGqscRhC3k.%26bt%3Dusr%26ch%3DDAQEAEAAB
ABRVbNIUBxbzHTkyi_ddVf0OQtLmLT1RDkw.%26mac%3DAQEAEAABABR5
a86uDsD9cZIzUpOSkH3AAY_P9BQ7KcA.,
netflixSecureId=v%3D2%26mac%3DAQEAEQABABTPprF7gOYbM287owai8a
YOo-3MOCtoiJ8., movieId=70116690, episodeId=null, trkId=3450286,
title=Toy Story 3, subtitle=, watchedDate=0, playbackBookmark=0,
bookmark=0] if surface exist false
⸺ 418

[VEVO Video Links]
⸺ 420

05-26 19:40:06.416: INFO/MediaPlayer(3431): URL is: http://
media.vevo.com/USZM21100061/h264/
uszm21100061_low_176x144_x264_86_quicktime_64.mp4?__gda__=1306
457977_09b9137b870442b76a29a54f0fe03aaa

FIG. 4A

SYSTEMS, METHODS, APPARATUS, AND ARTICLES OF MANUFACTURE TO MEASURE MOBILE DEVICE USAGE

FIELD OF THE DISCLOSURE

This disclosure relates generally to mobile devices, and, more particularly, to systems, methods, and apparatus to measure mobile device usage.

BACKGROUND

Usage of multiple devices with multimedia capabilities, such as smartphones, has significantly increased over the past several years. According to eMarketer, "In 2011, 68.2% of US Internet users, or 158.1 million people, will be watching video online at least once a month. By 2015, 76% of the Internet audience, or 195.5 million people, will be viewing video regularly online.... For 2011, eMarketer estimates that the group with the highest level of online video penetration will be the 25-to-34-year-old segment, at 19.5% of this population. Penetration will be almost as high among younger adults ages 18 to 24 (15.7%) and those 35 to 44 and 45 to 54 (16.7% and 15.7%, respectively). Among internet users—the part of the population naturally most interested in online video—the video viewing audience is young: 82% of teen internet users and 87% of young adults ages 18 to 24 currently watch online video at least once a month. Growth will continue among all age groups through 2015, to reach 93% of all young adult internet users and 42% of all seniors" (Reese, Stephanie. "Stat of the Day: 68.2% of US Internet Audience Are Online Video Viewers." eMarketer. http://www.emarketer.com/blog/index.php/stat-day-682-internet-audience-online-video-viewers/.2011-02-18).

BRIEF DESCRIPTION OF THE DRAWINGS

FIGS. 4A-4B illustrate an example debug log file that may be used by the example mobile device monitor of FIG. 2 to measure user behavior on the mobile device.

DETAILED DESCRIPTION

Figure 1:
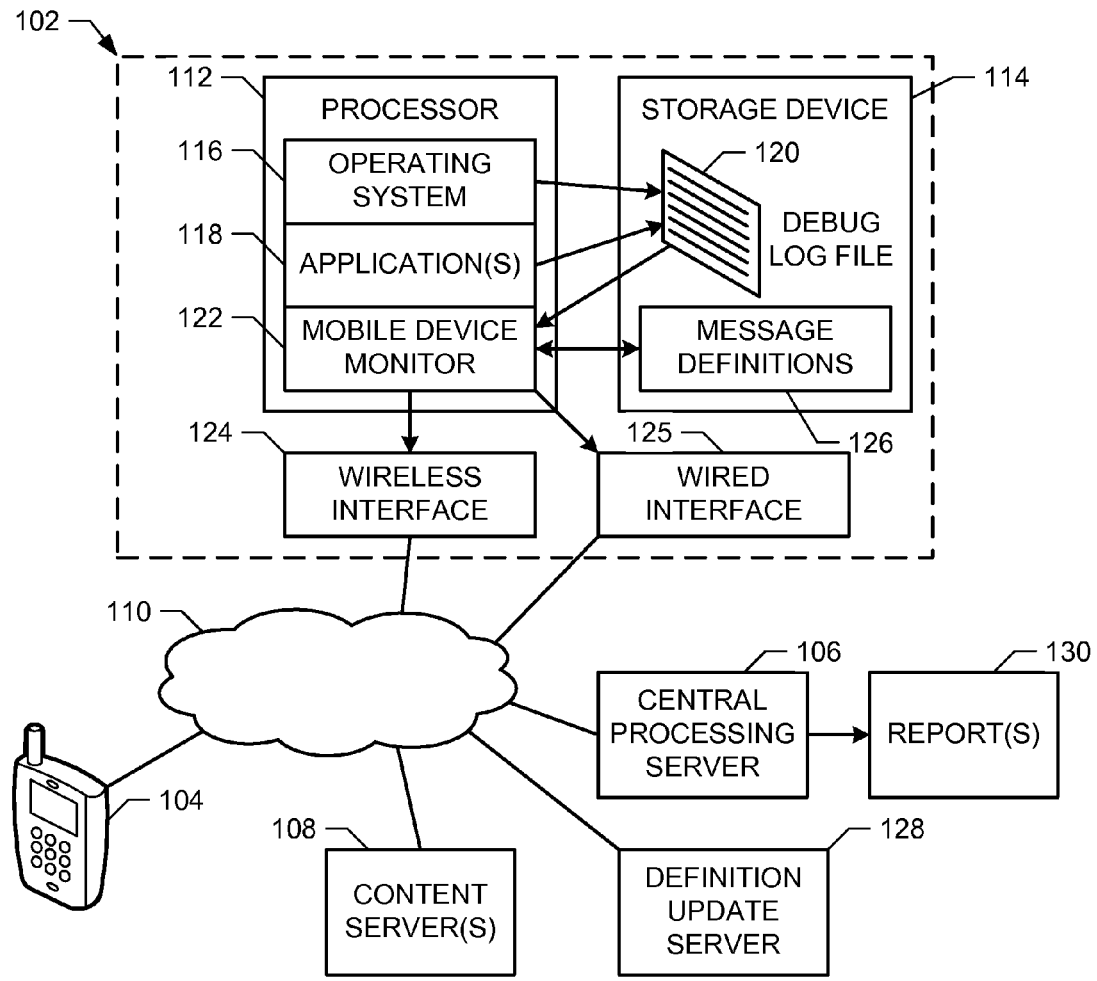
FIG. 1 is a block diagram of an example system constructed in accordance with the teachings of this disclosure to measure user behavior on a mobile device.

Modern mobile device operating systems, such as Android™, iOS®, and Windows Phone™ 7, enable users to listen to music, watch videos, surf the Internet, communicate via voice calls, and otherwise obtain and/or consume information. Much of this content is offered free to the user in exchange for the user agreeing to be exposed to advertisements on the mobile device. As used herein, "online information" refers collectively and/or individually to content and/or advertising. Monitoring such exposure to online information enables advertisers to better understand the needs of consumers and to provide more relevant advertising. Known methods of monitoring usage of mobile devices may be difficult to implement on certain types of devices due to strict controls on the types of software that can be installed on such devices. Additionally or alternatively, known methods of monitoring usage may be prohibitively expensive to implement due to the many different types of models of devices now available and in development. Further, known methods of monitoring usage of mobile activities may be difficult or impossible on some or all mobile devices due to the lack of a public application programming interface (API) with which to interact with the mobile devices and the attendant adaptation required to monitor such a wide range of device types.

Example systems, methods, and apparatus disclosed herein overcome deficiencies of the prior art by using a first mobile device application to filter a debug log file stored on a mobile device to obtain debug file entries, and using filtered debug file entries to determine usage of the mobile device. In some examples, the debug log file is updated by at least one of an operating system of the mobile device or a second mobile device application different from the first mobile device application.

In some examples, the mobile device sends the filtered debug log file to a server. The server receives filtered log files for a plurality of mobile devices, such as the mobile devices of users statistically selected for a mobile device monitoring panel.

In some examples, the mobile device sends a debug log file to a server. In some such examples, the mobile device does not filter the debug log file and, instead, sends the debug log file in its entirety. The server determines usage information from debug messages in the debug log file and writes the usage information to a usage information file.

In some other examples, a central processing server receives debug log files from at least a first mobile device of a first type and a second mobile device of a second type different from the first type. The central processing server processes the debug log files to do one or more of: determine one or more of usage patterns for one or more of the devices and/or device types; assign audience characteristics to one or more of the types of mobile devices; map audience compositions to content and/or advertisements; and/or assign ratings to websites.

While example systems, methods, apparatus, and articles of manufacture are discussed herein with reference to mobile devices such as smartphones, the example systems, methods, apparatus, and articles of manufacture may also be used to monitor devices that use similar operating systems and/or similar debug mechanisms. For example, the systems, methods, apparatus, and/or articles of manufacture disclosed herein may be used to monitor DVD players, CD players, digital video recorders, televisions, Blu-ray players, gaming consoles, personal video recorders, set top boxes, Internet appliances, digital media players (e.g., MP3 players), tablet computers, and/or combinations thereof, running the Android or other mobile operating systems and/or that use similar debug mechanisms.

FIG. 1 is a block diagram of an example system 100 to measure user behavior on a mobile device. The example system 100 of FIG. 1 includes multiple wireless mobile devices 102, 104, such as cellular phones, smartphones, and/or tablet computers, a central processing server 106, and one or more content server(s) 108. The example mobile devices 102, 104 and the central processing server 106 are in communication with a network 110 such as the Internet. The mobile devices 102, 104 of the illustrated example may communicate with each other (e.g., voice calls or data transmissions), with one or more of the content server 108 (e.g., to send or receive information or content), with the central processing server 106 (e.g., to report usage information), and/or with any other device configured to communicate digitally via the network 110. Although referred to as a "content server," the server 108 may additionally or alternatively serve advertisements.

The example mobile device 102 of FIG. 1 includes a processor 112 and a storage device 114. The example processor 112 may be any type of mobile processor, such as mobile processors available from ARM, Intel®, Samsung®, Apple®, Qualcomm®, and/or others. The example storage device 114 of FIG. 1 is a mobile storage device, such as NAND flash memory or another type of solid state storage device that may be used on a mobile device.

The example processor 112 of FIG. 1 executes an operating system 116 and one or more applications 118. The operating system 116 of FIG. 1 is the Android mobile operating system, although other operating systems may alternatively be used. The example applications 118 may be downloaded to the example mobile device 102 from, for example, an application store (also referred to as "app stores," "app markets," etc.) and/or one or more of the applications 118 may be included and/or integrated with the operating system 116.

During operation (e.g., code execution), the example operating system 116 and the example applications 118 store messages to a debug log file 120 stored in the storage device 114. For example, some developers choose to add debug code that causes the applications 118 to generate and store the debug messages, which can facilitate later improvement of the applications 118. As used herein, the term "debug message" refers to messages stored in any type of debug log and does not necessarily refer to any particular level or priority of message (e.g., it may include but is not limited to the DEBUG level as used in the Android operating system). Instead, the term "debug message" may refer to any level or priority (or no level or priority) of message stored in a debug log or a log having a similar design and/or purpose on a mobile device. A "debug log" is a log intended to store messages and/or information which may be used to review device and/or software performance (e.g., to diagnose errors and/or other problems in a device, its hardware, its firmware, and/or its software).

The example processor 112 of the illustrated example also executes instructions to implement a mobile device monitor 122. The example mobile device monitor 122 of the illustrated example monitors user interactions with the mobile device 102. Example interactions that may be identified by the mobile device monitor 122 include watching videos, listening to music, web browsing, exposure to advertisements, and/or playing games, although other interactions may also be monitored. To monitor these and/or other interactions, the example mobile device monitor 122 accesses the debug log file 120, into which the operating system 116 and one or more applications 118 have stored debug messages.

In the illustrated example, the mobile device monitor 122 is downloaded or otherwise provided to the mobile device 102 when a user of the mobile device 102 elects or is selected to participate in an audience measurement panel. An audience measurement panel includes a statistically selected group of individuals and/or families who have agreed to participate in the panel by providing, for example, media and/or advertisement exposure data. In the example of FIG. 1, panelist members have agreed to provide their demographic information and to have their mobile device activities, usage, and/or interactions monitored. In some examples, when individuals join a panel, they provide detailed information concerning their identity and demographics (e.g., gender, race, income, home location, occupation, etc) to an audience measurement entity (e.g., central processing server 106) tracking that panel.

In the example of FIG. 1, the mobile device monitor 122 periodically, aperiodically, on request, and/or in response to a condition being present (or absent), filters the debug messages in the example debug log file 120 to identify debug messages of interest, and transmits the debug messages of interest to a central data processing facility, such as the central processing server 106, for further processing and/or aggregation with usage information from other mobile devices 104. Examples of debug messages of interest include debug messages that are stored by music applications, video and/or movie applications, games, browser applications, and/or operating system functions such as activating or deactivating a phone speaker on the mobile device 102. However, different debug messages than the previously-referenced messages may additionally or alternatively be used to determine user interaction information. Additionally, debug messages may be used alone or in combination with other messages to infer user interactions with the mobile device 102.

In some examples, the debug log file 120 is a persistent file stored on the storage device 114. In some such examples, the operating system 116 does not purge or clear messages from the debug log file 120 or purges messages after a substantial amount of time has passed. Such infrequent purging of the debug log file 120 may cause the mobile device monitor 122 to process the same messages multiple times. Filtering and/or transmitting the same debug messages in the persistent debug log file 120 multiple times could cause data inaccuracies and/or substantially slow the performance of the mobile device monitor 122 (and, thus, the mobile device 102). The mobile device monitor 122 avoids duplication of filtering by, for example, storing an indication of which messages in the debug log file 120 have been previously filtered and/or transmitted. Example indications may include storing an indication in the debug log file 120 or storing an indication in another location. The example indication may indicate the most recently-processed message and/or a timestamp of the most recent processing performed by the mobile device monitor 122. The indication may be, for example, a debug message.

The example mobile device 102 of FIG. 1 further includes one or more wireless interface(s) 124. The example processor 112, the example operating system 116, the example applications 118, and/or the example mobile device monitor 122 of FIG. 1 use the example wireless interface(s) 124 to communicate with other devices and systems. For example, the wireless interface(s) 124 may include a cellular radio in the mobile device, a wireless local area network (WLAN) connection (e.g., a WiFi connection), a Bluetooth connection, a near field communications (NFC) connection, and/or any other past, present, or future wireless communications interface. Further, the example mobile device 102 may include a wired interface 125 such as a universal serial bus (USB) port, an IEEE 1394 (e.g., FireWire) port, and/or other wired interfaces. Other components of the example mobile device 102 have been omitted from FIG. 1 for brevity or they are not germane to the present disclosure.

The example mobile device monitor 122 of FIG. 1 determines which debug messages in the debug log file 120 are messages of interest based on message definitions 126 stored in the example storage device 114. The message definitions 126 provide a framework (e.g., prototype, pattern, etc.) for each type of message that may provide information of interest (e.g., user interaction information). The message definitions 126 of FIG. 1 are periodically updated to reflect changes in debug messages stored by applications 118 and/or the mobile device operating system 116, and/or to include additional debug messages for applications 118 that are newly available (for a particular device or in general). The example message definitions 126 may be downloaded by the example mobile device monitor 122 via a data connection with a definition update server 128 via the example network 108 and the example wireless interface 124 or the wired interface 125 of FIG. 1. In some other examples, the message definitions 126 are included in the code of the mobile device monitor 122 and/or are updated when the mobile device monitor 122 application is updated.

The example central processing server 106 of FIG. 1 receives filtered debug logs from multiple mobile devices 102, 104. The central processing server 106 aggregates the filtered debug logs and generates report(s) 130. For example, a requester may want to know how particular mobile devices (e.g., certain models) are used, how users of mobile devices that fit into particular demographics use their mobile devices, what types of mobile devices are used the most for particular activities, and/or any other combination of usage information. The report(s) 130 may be based on a request and/or based on one or more predetermined and/or standard queries.

Figure 2:
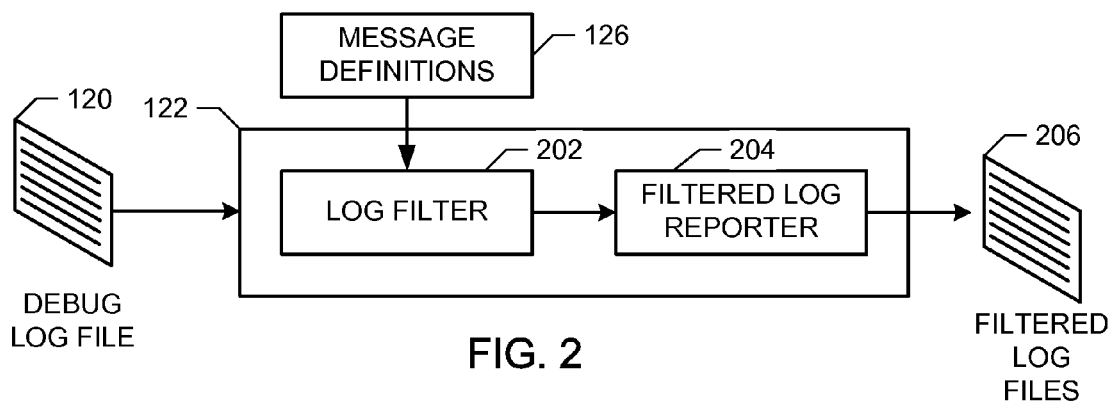
FIG. 2 is a block diagram of an example mobile device including a mobile device monitor, constructed in accordance with the teachings of this disclosure.

FIG. 2 is a block diagram of an example implementation of the mobile device monitor of FIG. 1. The example mobile device monitor 122 includes a log filter 202 and a filtered log reporter 204. The example log filter 202 of FIG. 2 receives or otherwise accesses a debug log file (e.g., the debug log file 120 of FIG. 1). The debug log file 120 includes one or more debug messages that have been previously stored by one or more other applications on a mobile device in which the example mobile device monitor 122 is implemented.

The example log filter 202 of FIG. 2 filters the debug log file 120 to identify debug messages of interest. For example, a message definition may be a pattern with which the example log filter 202 parses and/or examines one or more debug messages in the debug log file 120. The example log filter 202 provides debug messages of interest (e.g., messages that conform to one or more message definitions) to the filtered log reporter 204 and discards (e.g., does not provide to the filtered log reporter 204) other debug messages. The filtered log reporter 204 transmits one or more files of the debug messages of interest as filtered log files 206 to a central processor (e.g., the central processing server 106 of FIG. 1). For example, the filtered log reporter 204 may establish a voice connection or a data connection with the server 106 via wired and/or wireless communications interface (e.g., the wireless interface 124 of FIG. 1). On establishing a connection with the server 106, the example filtered log reporter 204 uploads the filtered log file 206 including the debug messages filtered by the log filter 202.

In some examples, the log filter 202 and the filtered log reporter 204 filter the debug log messages and/or transmit the filtered log(s) 206 in response to the passage of a threshold amount of time. In some other examples, the log filter 202 and the filtered log reporter 204 filter the debug log messages and/or transmit the filtered log(s) 206 when the debug log file 120 and/or the filtered log file 206 achieve a threshold size.

Figure 3:
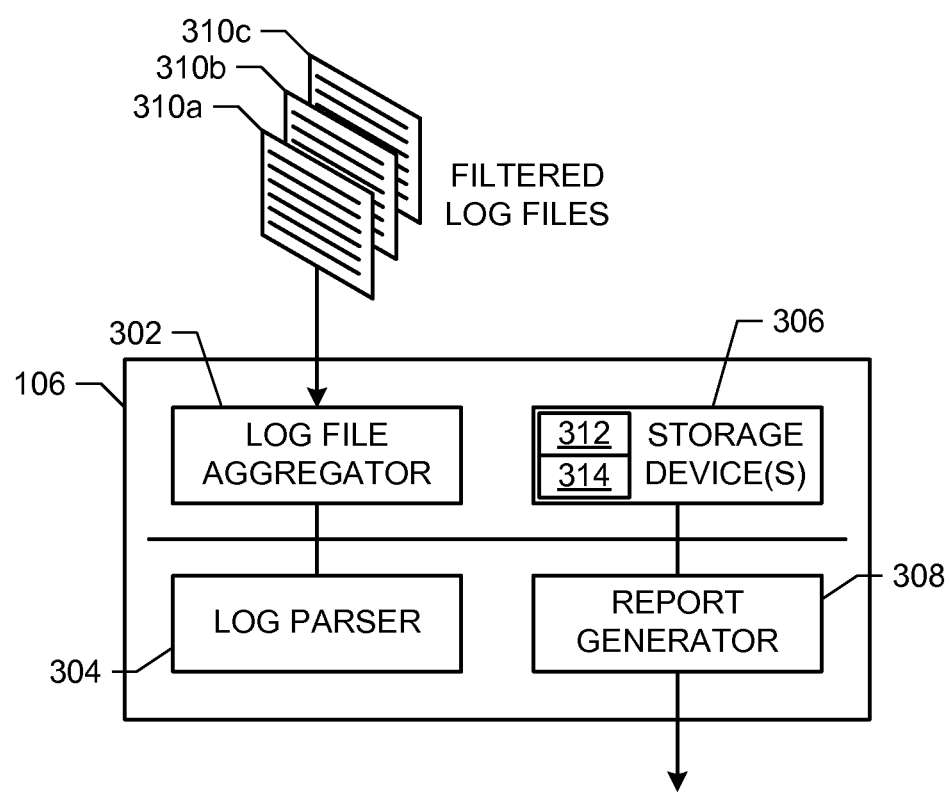
FIG. 3 is a block diagram of an example apparatus constructed in accordance with the teachings of this disclosure to monitor usage of mobile devices.

FIG. 3 is a block diagram of an example implementation of the example central processing server 106 of FIG. 1 to aggregate and process filtered log files and/or to generate reports representative of mobile device usage. The example server 106 may be implemented using the computer 900 of FIG. 9 and/or the instructions of FIG. 6.

The example server 106 of FIG. 3 includes a log file aggregator 302, a log parser 304, one or more storage devices 306, and a report generator 308. The server 106 receives multiple filtered log files 310a, 310b, 310c from one or more mobile devices (e.g., the mobile devices 102, 104 of FIGS. 1 and 2). The example filtered log files 310a-310c may include filtered log files from a single mobile device covering mobile device usage during multiple intervals and/or may include filtered log files from multiple mobile devices covering mobile device usage during identical, substantially identical, overlapping, and/or distinct, non-overlapping intervals.

The example log file aggregator 302 of FIG. 3 receives the filtered log files 310a-310c (e.g., via the network 110 of FIG. 1) and aggregates the filtered log files 310a-310c into one or more aggregated log files 312. The aggregated log files 312 are stored on the storage device(s) 306. In some examples, the log file aggregator 302 generates and/or maintains a single (e.g., master) aggregated log file 312. Additionally or alternatively, the log file aggregator 302 maintains different aggregated log files 312, which may be organized by device type, time interval, activity, debug message type, and/or any other organization scheme. Further, the contents of different aggregated log files 312 may overlap.

The example log parser 304 of FIG. 3 parses the debug messages in the aggregated log file(s) 312 stored in the storage device(s) 306 to, for example, determine usage information from the debug messages. The log parser 304 of the illustrated example extracts the usage information from the debug messages. In the example of FIG. 3, extracted usage information is more concise and clear than complete debug message(s) from which the information is extracted. For example, the log parser 304 may parse the following debug message:

---

"05-26 18:43:29.991: INFO/MediaPlayer(3731): URL is:
http://v21.lscache5.googlevideo.com/videoplayback?app=youtube_gdata&clie
nt=mvapp-android-
verizon&devKey=ATEU_r3RX2afGwq_gCqiS2UO88HsQjpE1a8d1GxQnGD
m&el=standard&expire=1309045275&id=72889325bafd9b4e&ip=0.0.0.0&ip
bits=0&itag=18&key=yta1&signature=8FA065AC595B07B60722686BC0D8
C2073029EA5F.7C2224F5D5E3D7ACD2DBA67BF3724A1FF9BAF4A8&s
params=id,itag,uaopt,ip,ipbits,expire&uaopt=no-save"

--- into the following entry in a usage information table:

| | | |
|---|---|---|
| 05:26:11/18:43:29.991 | YouTube | Device10231 |

The example entry provided above lists the extracted timestamp for the debug message (05:26:11/18:43:29.991), the application (YouTube), and an assigned and/or arbitrary device identifier (Device10231) to identify from which of a plurality of mobile devices 102, 104 a particular debug messages was received. In some examples, the log parser 304 is provided with decryption information (e.g., a decryption key) to decrypt information in a URL so that the log parser 204 may further determine, from the debug message, a title or other information for content that was logged as accessed (or requested) by the application. The example log parser 304 stores the entry, including any extracted information, in a usage information table 314 in the example storage device(s) 306.

The example report generator 308 receives the parsed information from the log parser 304 and generates one or more reports based on the parsed information. For example, the report generator 308 may query the aggregated log file(s) 312 to generate reports for usage of a particular application (e.g., a particular music player application, a particular video player application, a particular game, a web browser, etc.), usage of a class of applications (e.g., music players, video players, media players, games, web browsers), exposure to advertisements, accessed URLs and/or URIs, and/or any other type of information that can be inferred from one or more debug messages received in the example filtered log files 310a-310c and/or stored in the example aggregated log file(s) 312.

In some examples, the central processing server 106 receives one or more unfiltered files (e.g., debug logs transferred by the mobile device(s) 102, 104 in their entireties). In some such examples, the central processing server 106 (e.g., via the log parser 304) parses the received debug log files to identify debug messages of interest (e.g., messages having keywords, URLs, timestamps, and/or any other useful information indicative of mobile device usage). The example log parser 304 converts identified debug messages into usage information and/or stores the usage information in a file (e.g., in the example usage information table(s) 314). In this manner, the mobile devices 102, 104 may use fewer processing resources to collect and transmit the usage information to the central processing server 106.

Figure 4B:

FIGS. 4A-4B illustrate an example debug log file 400 that may be used by the example mobile device monitor 122 of FIGS. 1 and 2 to measure user behavior on a mobile device. The example debug log file 400 may represent the debug log file 120 stored in the storage device 114 of FIG. 1, and includes debug messages stored by an operating system 116 and/or one or more applications 118. The text shown in brackets in FIGS. 4A and 4B are included for purposes of illustration, and are not necessarily shown in a debug log file 400. Similarly, the example messages shown in FIGS. 4A and 4B and discussed below are merely illustrative of messages that may be found and used by a mobile device monitor 122. Other messages and/or logs may be similarly identified, filtered, and/or parsed by the example mobile device monitor 122 and/or the example server 106 of FIGS. 1, 2, and/or 3.

A first debug message 402 included in the example debug log file 400 is an online video/audio URI. Specifically, the message 402 includes a timestamp 404 (05-26 18:43:29.991), an application title 406 (MediaPlayer(3731)), and at least a partial URI 408 of the resource requested by the application (http://v21.1scache5.googlevideo.com/videoplayback? . . . ). The example log filter 202 of FIG. 2 may determine that the example message 402 is a message of interest based on the application title 406. Additionally, the example log parser 304 of FIG. 3 may identify the timestamp 404, the application title 406, and/or a video played by the corresponding application based on the URI 408.

A second debug message 410 is a movie played using an application associated with the online movie service Netflix® (e.g., Netflix Movies). Like the first debug message 402, the second example debug message 410 includes a timestamp 412 (07-21 11:09:34.563) and an application title 414 (nfplayer(4483)). The debug message 410 further includes an argument section 416, as well as a description 418 (in bold). Based on the debug message 410, the example log filter 202 of FIG. 2 may determine that the example message 410 is a message of interest based on the application title 414. Additionally, the example log parser 304 of FIG. 3 may identify the timestamp 412, the application title 414, and/or a video played by the corresponding application based on the description 418.

Another debug message 420 is generated by a music video player application associated with the VEVO® online service. The example debug message 420 includes a timestamp 422 (05-26 19:40:06.416), an application title 424 (MediaPlayer(3431)), and a URL 426 (http://media.vevo.com/USZM21100061/ . . . ). Based on the debug message 420, the example log filter 202 of FIG. 2 may determine that the example message 426 is a message of interest based on the application title 424 and/or based on the presence and/or content of the URL 426. Additionally, the example log parser 304 of FIG. 3 may identify the timestamp 422, the application title 424, and/or content played by the corresponding application based on the description 426. In some examples, the log parser 304 may make and/or store one or more inferences regarding the information included in the URL 426 directed to the resolution of a video (e.g., low_176x144_264_86_quicktime_64.mp4) and/or the format of the video.

Turning to FIG. 4B, an example debug message 428 includes a timestamp 430 (05-26 19:28:51.672), an application title 432 (MediaPlayer(3162)), and a URI 434 (http://trans-idx.pandora.tv/ . . . ) representative of media played by an application associated with the Pandora® Internet radio service. Based on the debug message 428, the example log filter 202 of FIG. 2 may determine that the example message 428 is a message of interest based on the application title 432 and/or based on the presence and/or content of the URI 434. Additionally, the example log parser 304 of FIG. 3 may identify the timestamp 430, the application title 432, and/or content played by the corresponding application based on the URI 434.

Additional example debug messages 438, 440, 442 are representative of advertisements requested and/or displayed on a mobile device by a service associated with the AdMob® service. The example debug messages 438-442 include timestamps 444, 446, 448 (05-26 20:13:59.267, 05-26 20:13: 59.267, 05-26 20:14:36.837) and application or service titles 450, 452, 454 (INFO/AdMobSDK(4136), INFO/AdMobSDK(4136), INFO/ActivityManager(2229)), respectively. The debug message 438 includes an informational message 456 (e.g., Ad returned (1060 ms), a status update that an advertisement was returned from a request for an advertisement, and an indication of the advertisement content). The debug message 440 includes another informational message 458 (e.g., Requesting fresh ads every 30 seconds, information regarding the activities of the advertisement service or application). The example debug message 442 includes an informational message 460 (Starting activity:) reporting an activity and including a URL 462 (http://www.apptrusted.com/battery/ . . . ). The example log filter 202 of FIG. 2 may determine that one or more of the debug messages 438, 440, 442 are messages of interest based on the titles 450-454, the messages 456-460, and/or the URL 470. Additionally, the example log parser 304 may make one or more inferences regarding advertisement exposure on the mobile device based on the timestamps 444-448, the service titles 450-454, the informational messages 456, 458, and/or the URL 462. An example inference drawn by the log parser 304 from the timestamps 444-448, the service titles 450-454, the informational messages 456, 458, and/or the URL 462 may include a number of advertisements to which the user of the mobile device was exposed in a period of time.

An example debug message 464 represents advertisement activity associated with an AdWhirl service. The example debug message 464 includes a timestamp 466 (09-12 15:25:36.234), a service title 468 (INFO/ActivityManager(1374)), and a URL 470 (http://cwdtrack.com/ ... ). The example log filter 202 of FIG. 2 may determine that the debug message 464 is a message of interest based on the service title 468 and/or the URL 470. The example log parser 304 may determine information regarding advertisement exposure on the mobile device based on the timestamp 466, the service title 468, and/or the URL 470.

A set of debug messages 472-488 represents voice call activity on a mobile device. For the debug message pairs having identical timestamps (e.g., the debug messages 472, 474, the debug messages 476, 478, the debug messages 482-486), the debug message pairs may be considered to be the same debug message. The log filter 202 may determine one or more of the debug messages 472-488 to be messages of interest based on their content and/or one or more service titles in the messages 472-488. Additionally, the example log parser 304 may determine from the example debug messages 472-480 that the mobile device is engaged in a voice call and that a speakerphone feature of the mobile device is engaged. In contrast, the log parser 304 may determine from the example debug messages 482-488 that the mobile device is engaged in a voice call and that the earpiece speaker is engaged (e.g., the speakerphone feature is not engaged).

While example inferences are discussed above with reference to the example messages of FIGS. 4A and 4B, the example systems, methods, apparatus, and articles of manufacture disclosed herein are not limited to such inferences. Instead, the systems, methods, apparatus, and articles of manufacture disclosed herein may draw additional or alternative inferences (e.g. any inferences appropriate to the messages). These inferences may be based on programming best practices, business rules, developed patterns of usage, and/or any other source.

While an example manner of implementing the mobile device monitor 122 and central processing server 106 of FIG. 1 have been illustrated in FIGS. 2 and 3, one or more of the elements, processes and/or devices illustrated in FIGS. 2 and 3 may be combined, divided, re-arranged, omitted, eliminated and/or implemented in any other way. Further, the example log filter 202, the example filtered log reporter 204, the example log file aggregator 302, the example log parser 304, the example storage device(s) 306, the example report generator 308, the example filtered log files 310a-310c, the example aggregated log files 312, the example usage information table 314 and/or, more generally, the example mobile device monitor 122 and central processing server 106 of FIG. 1 of FIGS. 1 and 2 may be implemented by hardware, software, firmware and/or any combination of hardware, software and/or firmware. Thus, for example, any of the example log filter 202, the example filtered log reporter 204, the example log file aggregator 302, the example log parser 304, the example storage device(s) 306, the example report generator 308, the example filtered log files 310a-310c, the example aggregated log files 312, the example usage information table 314 and/or, more generally, the example mobile device monitor 122 and central processing server 106 of FIGS. 1 and 2 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example log filter 202, the example filtered log reporter 204, the example log file aggregator 302, the example log parser 304, the example storage device(s) 306, the example report generator 308, the example filtered log files 310a-310c, the example aggregated log files 312, and/or the example usage information table 314 are hereby expressly defined to include a tangible computer readable medium such as a memory, DVD, CD, Blu-ray, etc. storing the software and/or firmware. Further still, the example mobile device monitor 122 and/or the example central processing server 106 of FIGS. 1 and 2 may include one or more elements, processes and/or devices in addition to, or instead of, those illustrated in FIGS. 1 and 2, and/or may include more than one of any or all of the illustrated elements, processes and devices.

Flowcharts representative of example machine readable instructions for implementing the example mobile device monitor 122 and the example central processing server 106 of FIG. 1 are shown in FIGS. 5, 6, 7, and 8. In this example, the machine readable instructions comprise a program for execution by a processor such as the processor 912 shown in the example computer 900 discussed below in connection with FIG. 9. The program may be embodied in software stored on a tangible computer readable medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5, 6, 7, and 8, many other methods of implementing the example mobile device monitor 122 and central processing server 106 may alternatively be used. For example, the order of execution of the blocks may be changed, and/or some of the blocks described may be changed, eliminated, or combined.

As mentioned above, the example processes of FIGS. 5, 6, 7, and 8 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5, 6, 7, and 8 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 5:
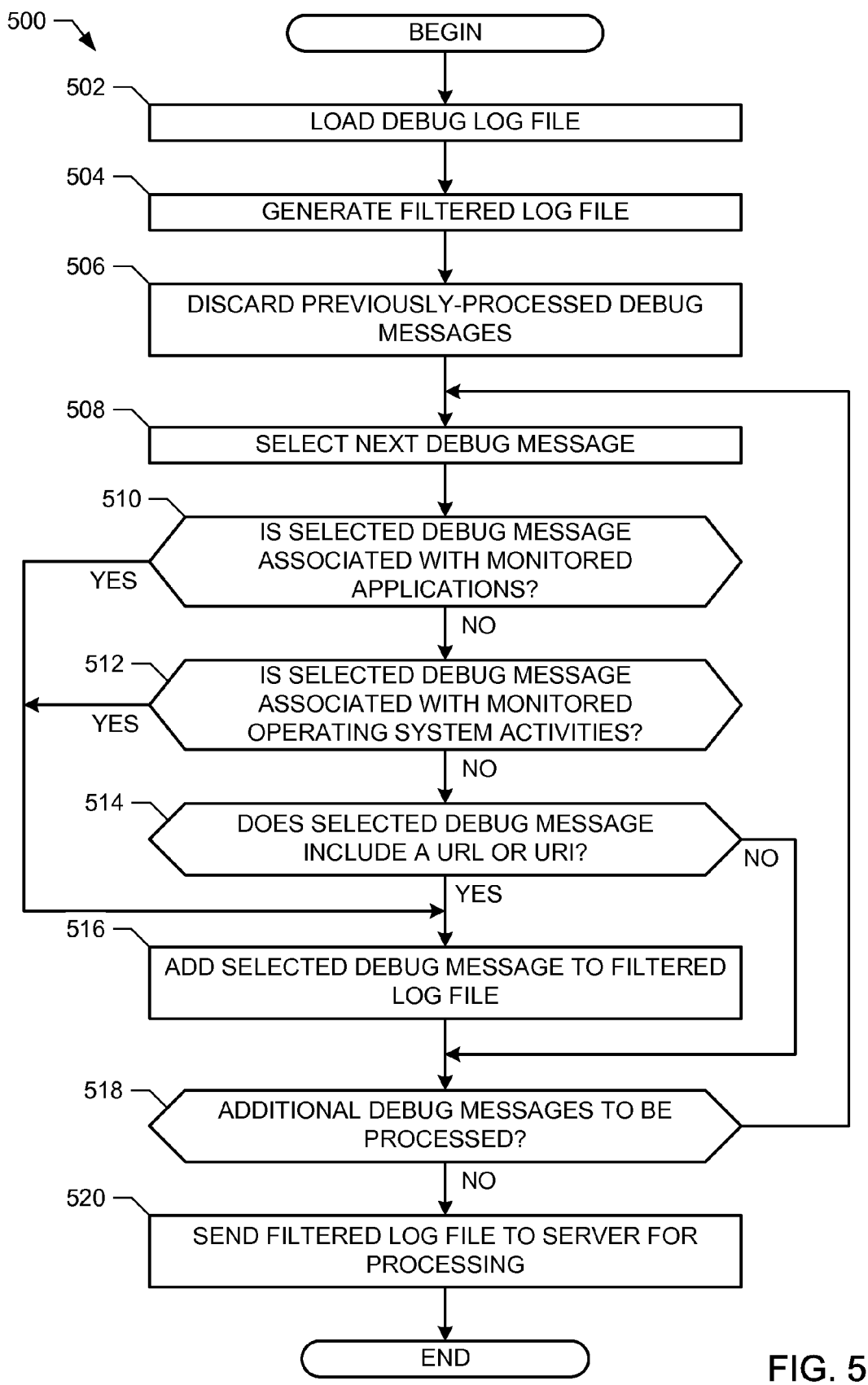
FIG. 5 is a flowchart representative of example machine readable instructions which may be executed to measure user behavior on a mobile device.

FIG. 5 is a flowchart representative of example machine readable instructions 500 which may be executed to measure user behavior on a mobile device. The example instructions 500 of FIG. 5 may be used to implement, for example, the mobile device monitor 122 of FIGS. 1 and 2. In some examples, the instructions 500 are performed or executed periodically, aperiodically, on request, at predetermined times, and/or in response to a condition being present (or absent).

The example instructions 500 begin by loading a debug log file (block 502). For example, the log filter 202 of FIG. 2 accesses the debug log file 120 (e.g., stored in the storage device 114 of FIG. 1). In some examples, the log filter 202 generates a copy of the debug log file 120, where the copy is to be processed instead of the debug log file 120. The example filtered log reporter 204 generates a filtered log file (e.g., the filtered log file 206 of FIG. 2) (block 504). The filtered log file 206 stores debug messages that are selected (e.g., not discarded) by the log filter 202. The example log filter 202 discards previously-processed debug messages (block 506). For example, if any messages in the debug log file 120 have been previously processed by the log filter 202, the log filter 202 does not need to consider the content of the messages (e.g., filtering out messages with a timestamp earlier than a most recent filtering event).

To filter the remaining messages in the debug log file 120, the example log filter 202 selects the next debug message (block 508). For example, the log filter 202 may select the next debug message having the earliest time stamp. In some examples, such as the debug messages 472, 474 of FIG. 4B, the log filter 202 may select multiple debug messages having identical timestamps for consideration as a single debug message. The log filter 202 determines whether the selected debug message is associated with monitored applications (block 510). For example, the log filter 202 may parse through the selected debug message to identify the application name to determine whether an application corresponding to the identified application name is to be monitored. If the selected debug message is not associated with any monitored applications (block 510), the log filter 202 determines whether the selected debug message is associated with any monitored operating system activities (block 512). For example, the log filter 202 may parse through the selected debug message to identify a service name to determine whether an operating system service corresponding to the identified service name is to be monitored. If the selected debug message is not associated with monitored operating system activities (block 512), the example log filter 202 determines whether the selected debug message includes a URL or a URI (block 514).

If the selected debug message is associated with monitored applications (block 510) or monitored operating system activities (block 512), or if the selected debug message includes a URL or a URI (block 514), the example filtered log reporter 204 adds the selected debug message to the filtered log file 206 (block 516). If the selected debug message is not associated with either monitored applications (block 510) or monitored operating system activities (block 512), and if the selected debug message does not include a URL or a URI (block 514), the example log filter 202 discards the selected debug message (e.g., does not add the selected debug message to the filtered log file 206, skips block 516). While example conditions are evaluated in blocks 510-514 of FIG. 5 to determine a message of interest, other conditions may additionally or alternatively be used to add a message to the filter log file and/or to discard a message.

After adding the selected debug message to the filtered log file (block 516) or discarding the debug message, the example log filter 202 determines whether there are additional debug messages to be processed (block 518). If there are additional debug messages (block 518), control returns to block 508 to select the next debug message. If there are no additional debug messages (block 518), the example filtered log reporter 204 sends the filtered log file 206 to a server (e.g., the central processing server 106 of FIG. 1) for processing (block 520). The example instructions 500 may then end and/or iterate (e.g., at a later time) to process additional debug log messages.

Figure 6:
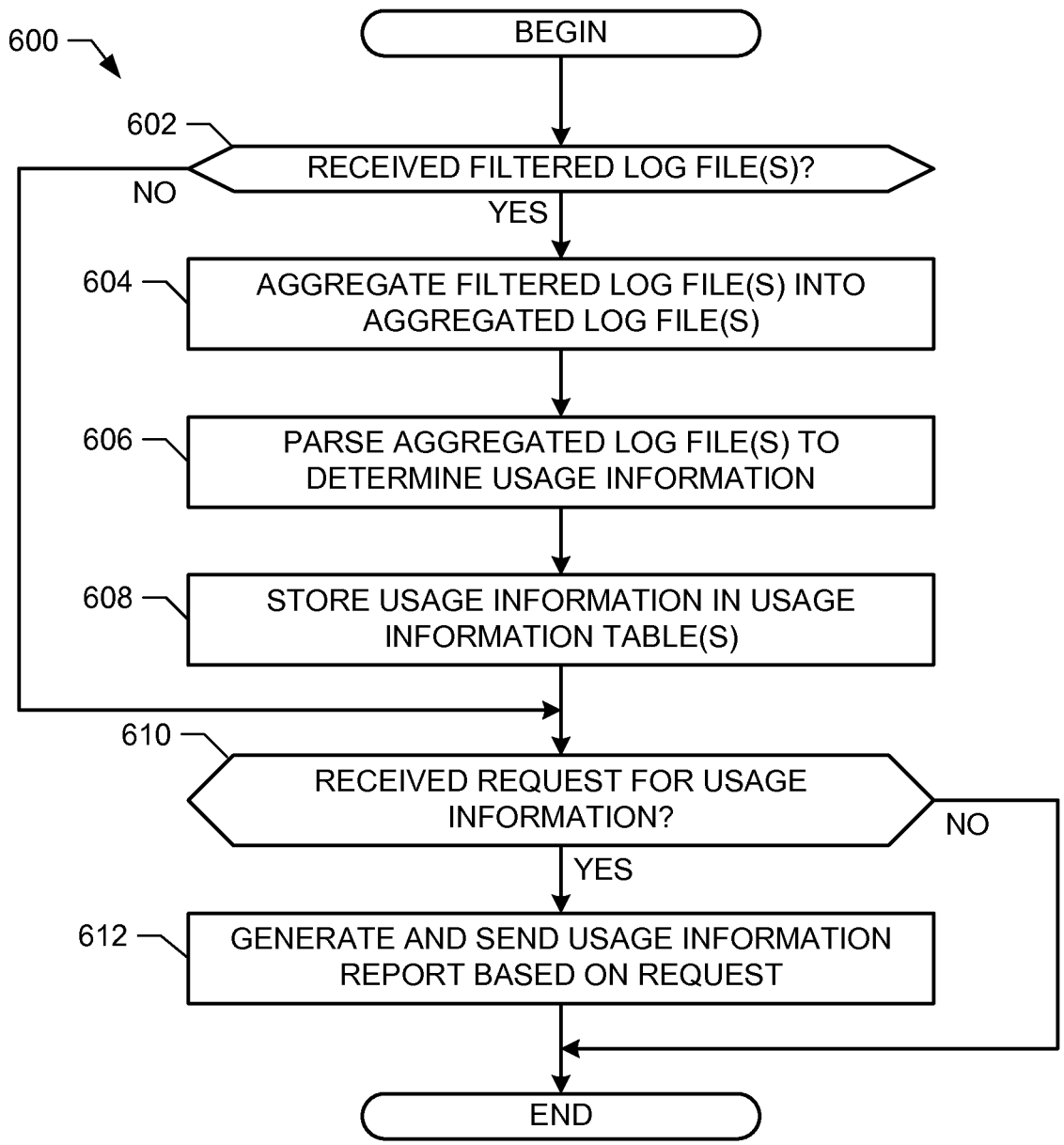
FIG. 6 is a flowchart representative of example machine readable instructions which may be executed to measure mobile device usage.

FIG. 6 is a flowchart representative of example machine readable instructions 600 which may be executed to measure mobile device usage. The example instructions 600 of FIG. 6 may be used to implement, for example, the central processing server 106 of FIGS. 1 and 3. In some examples, the instructions 600 are performed or executed periodically, aperiodically, on request, at predetermined times, and/or in response to a condition being present (or absent).

The example instructions 600 being by determining whether filtered log file(s) have been received (block 602). For example, the log file aggregator 302 may receive one or more filtered log files 310a-310c from one or more mobile devices (e.g., the mobile devices 102, 104 of FIG. 1). If filtered log file(s) have been received (block 602), the example log file aggregator 302 aggregates the filtered log file(s) into one or more aggregated log file(s) (block 604). For example, the log file aggregator 302 may store the debug log messages in the filtered log files into one or more aggregated log files in a storage device (e.g., the aggregated log file(s) 312 in the storage device(s) of FIG. 3).

The example log parser 304 parses the aggregated log file(s) to determine usage information (block 606). The example log parser 304 stores the determined usage information in one or more usage information table(s) (block 608). For example, the log parser 304 may store the same usage information in multiple tables 314 organized into different demographic divisions in the storage device(s) 306 of FIG. 3. In some other examples, the log parser 304 stores the usage information into a single master usage information table 314 in the storage device 306.

After storing the usage information in the usage information table(s) (block 608) or if no filtered log files have been received (block 602), the example report generator 308 determines whether a request for a usage information report has been received (block 610). A request for usage information may include, for example, a query specifying particular type(s) of mobile device usage, one or more particular activities, one or more demographic selections, one or more time periods, and/or any other organization or division of usage information. If a request has been received (block 610), the example report generator 308 generates and sends a usage information report based on the request (block 612). For example, the report generator 308 may execute one or more queries on the usage information table(s) 314 based on the request, generate the report based on the results of the queries, and transmit the report to a requester.

After generating and sending the report (block 612), or if no requests for usage information reports have been received (block 610), the example instructions 600 may end and/or iterate to monitor for additional filtered log files and/or report requests.

Figure 7:
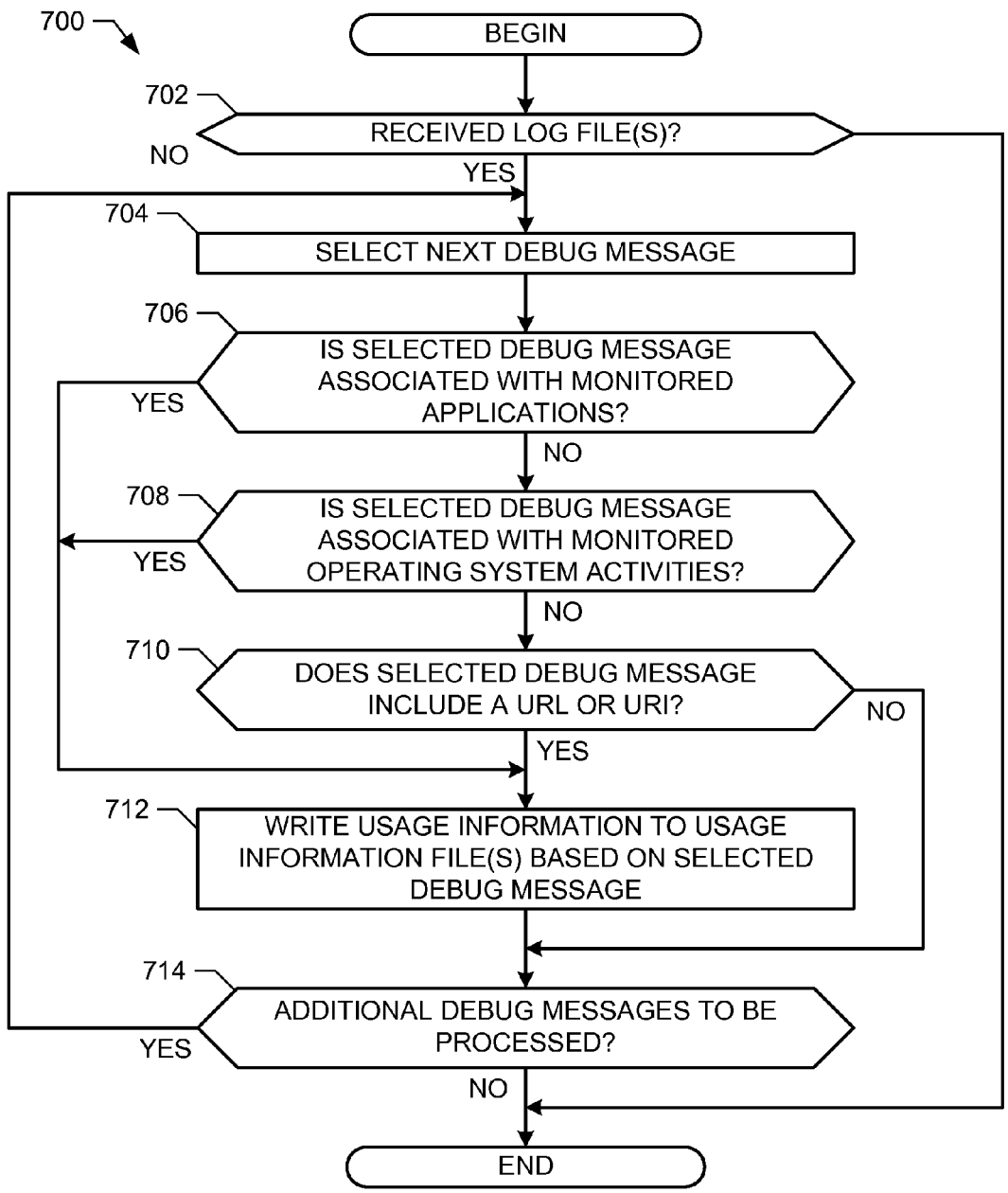
FIG. 7 is another flowchart representative of example machine readable instructions which may be executed to measure mobile device usage.

FIG. 7 is a flowchart representative of machine readable instructions 700 which may be executed to monitor mobile device usage. The example instructions 700 of FIG. 7 may be used to implement, for example, the central processing server 106 of FIGS. 1 and 3. In some examples, the instructions 700 are performed or executed periodically, aperiodically, on request, at predetermined times, and/or in response to a condition being present (or absent).

The example instructions 700 begin by determining (e.g., via the log aggregator 302 or the log parser 304 of FIG. 3) whether debug log files have been received (block 702). For example, the central processing server 106 may receive one or more debug files from one or more mobile devices (e.g., the mobile devices 102, 104 of FIG. 1). Unlike the example of FIG. 6, in the example of FIG. 7 the received log files may not be filtered by the mobile devices 102, 104 (e.g., the log files are sent by the devices 102, 104 in their entireties).

If one or more debug log file(s) have been received (block 702), the example log parser 304 selects a debug message from the received log file(s) (block 704). The example log parser 304 determines whether the selected debug message is associated with any monitored applications (block 706). Block 706 may be performed by the log parser 304 in a similar manner as block 510 described above. If the selected debug message is not associated with any monitored applications (block 706), the example log parser 304 determines whether the selected debug message is associated with any monitored operating system activities (block 708). Block 708 may be performed by the log parser 304 in a similar manner as block 512 described above. If the selected debug message is not associated with any monitored operating system activities (block 708), the example log parser 304 determines whether the selected debug message includes a URL and/or a URI (block 710). Block 710 may be performed by the log parser 304 in a similar manner as block 514 described above.

In some examples, the log parser 304 performs blocks 706, 708, and/or 710 of FIG. 7 by identifying and/or drawing inferences from debug messages based on the presence of one or more of a timestamp (e.g., the timestamps 404, 412 of FIG. 4A), a URI (e.g., the URI 408 of FIG. 4A), an application or service names or titles (e.g., the application and/or service titles 450, 452, 454 of FIG. 4B), arguments (e.g., the arguments 416 of FIG. 4A), descriptions (e.g., the description 418 of FIG. 4A), informational messages (e.g., the informational message 456 of FIG. 4B), a URL (e.g., the URL 470 of FIG. 4B), and/or any other information identifiable in a debug message.

If the selected debug message is associated with a monitored application (block 706) or a monitored operating system activity (block 708), and/or if the selected debug message includes a URL or URI (block 710), the example log parser 304 of FIG. 3 writes (converts the debug message into) usage information into a usage information file (e.g., the usage information table 314 of FIG. 3) (block 712). Writing the device usage information may include writing one or more of an application name (e.g., to an application field), a time of accessing the application (e.g., to a timestamp field), a uniform resource locator or a uniform resource identifier (e.g., to a URL/URI field), an informational message (e.g., to an information, description, or arguments field), and/or any other device usage information. On the other hand, if the selected debug message is not associated with either a monitored application (block 706) or a monitored operating system activity (block 708), and if the selected debug message does not include a URL or a URI (block 710), the example log parser 304 discards (e.g., does not write usage information for) the selected debug message (e.g., skips block 712).

In some examples, the usage information may be used to project a number of users associated with the activity based on the usage information and a panel characteristic. Additionally or alternatively, the usage information may be used to determine a number of users of a device model, either alone or in combination with characteristics of the panel.

After performing or skipping block 712, the example log parser 304 determines whether there are additional debug messages to be processed (block 714). If there are additional debug messages (block 714), control returns to block 704 to select the next debug message. If there are no further debug messages (block 714), the example instructions 700 may end and/or iterate to process additional debug logs.

Figure 8:
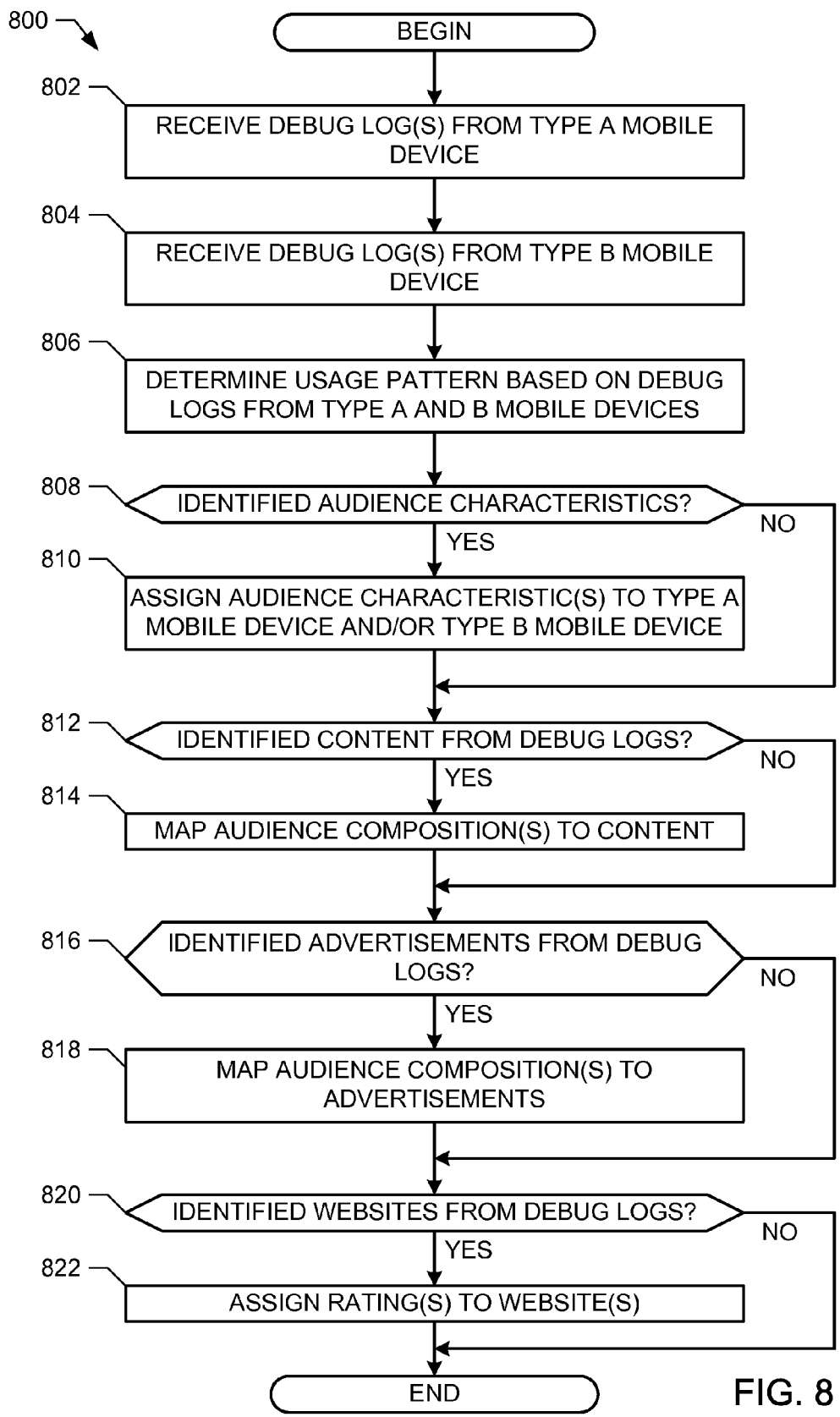
FIG. 8 is yet another of example machine readable instructions which may be executed to measure mobile device usage.

FIG. 8 is a flowchart representative of machine readable instructions 800 which may be executed to monitor mobile device usage. The example instructions 800 of FIG. 8 may be used to implement, for example, the central processing server 106 of FIGS. 1 and 3. In some examples, the instructions 800 are performed or executed periodically, aperiodically, on request, at predetermined times, and/or in response to a condition being present (or absent).

The example instructions 800 of FIG. 8 begin by receiving (e.g., the central processing server 106) one or more debug log(s) from a mobile device having a first type (e.g., type A) (block 802). The example central processing server 106 further receives one or more debug log(s) from a mobile device having a second type (e.g., type B) different than the first type (block 804). In some examples, the central processing server 106 receives one or more debug logs from additional types of mobile devices. The example central processing server 106 may further receive debug logs from multiple devices of the same type in addition to receiving debug logs from at least one device of at least two different types. Mobile devices may be considered to have different types based on having different operating systems, different hardware configurations, different firmware configurations, different software configurations, and/or different versions of any of the operating system, hardware, firmware, and/or software. In some other examples, devices having different operating systems, hardware, firmware, and/or software, and/or different versions thereof, may be selected to be considered to have the same type.

The example central processing server 106 (e.g., via the log parser 304 of FIG. 3) determines a usage pattern based on the received debug logs from at least the type A and type B devices (block 806). For example, a usage pattern may include statistics on application usage for one or more applications on either or both types of device, operating system feature usage for one or more applications on either or both types of device, content exposure activities, advertisement exposure, and/or any other type of device usage. These similarities and/or differences may be identified based on, for example, the presence and/or absence of debug messages having similar or identical application names (e.g., netflix, videoplayer, pandora, audioplayer, etc.). Example usage patterns may draw similarities and/or note differences between usages of different types of devices.

The example central processing server 106 (e.g., via the log parser 304 of FIG. 3) determines whether audience characteristics can be identified from the debug logs (block 808). If audience characteristics can be identified (block 808), the example central processing server 106 (e.g., via the log parser 304 of FIG. 3) assigns audience characteristics to at least one of the first type of mobile device (type A) and/or the second type of mobile device (type B) (block 810). For example, the log parser 304 may determine whether demographic information can be assigned to content exposure based on patterns and/or statistical similarities and/or differences between the debug logs of the different device types. Other audience characteristics may additionally or alternatively be assigned.

The example central processing server 106 (e.g., via the log parser 304 of FIG. 3) determines whether content may be identified from the debug logs (block 812). For example, the log parser 304 may determine whether the debug messages associated with a Netflix application (or other content exposure applications) used on the different types of devices include information (e.g., descriptions, URLs, URIs, informational messages, etc.) representative of content and/or portions of content (e.g., movies, songs, episodes of a television program, Internet videos, electronic books, etc.). If content can be identified from the debug logs (block 812), the example log parser 304 maps audience composition(s) to the content (block 814). For example, the log parser 304 may map to the content (e.g., store usage or exposure information to cause the content to be credited with) the demographics, counts (e.g., number of devices), and/or other characteristics of the devices and/or the users of the devices from which the debug logs identifying the content were obtained.

The example central processing server 106 (e.g., via the log parser 304 of FIG. 3) determines whether advertisements may be identified from the debug logs (block 816). For example, the log parser 304 may determine whether the debug messages include advertisement information (e.g., application and/or service titles associated with advertisement delivery, URLs or URIs identifying advertisements, etc.). If advertisement information can be identified from the debug logs (block 816), the example log parser 304 maps audience composition(s) to the advertisements (block 818). For example, the log parser 304 may map to the advertisement (e.g., store usage or exposure information to cause the advertisement to be credited with) the demographics, counts (e.g., number of devices), and/or other characteristics of the devices and/or the users of the devices from which the debug logs identifying the content were obtained. The advertisement information may be useful for determining the types of advertisements that are being delivered to a particular device type or set of device types.

The example central processing server 106 (e.g., via the log parser 304 of FIG. 3) determines whether websites may be identified from the debug logs (block 820). For example, the log parser 304 may determine whether the debug logs include website URLs. If websites may be identified from the debug logs (block 820), the example log parser 304 assigns ratings to the websites (e.g., according to the audience determined from the debug logs) (block 822). For example, the log parser 304 may project a number of visitors to the identified website based on the number of debug logs received that include the website, the demographics associated with the debug logs, the number of visits, and/or other information from which the number of visitors may be projected.

The example instructions 800 may then end and/or iterate to process additional debug logs from the same and/or different device types.

Figure 9:
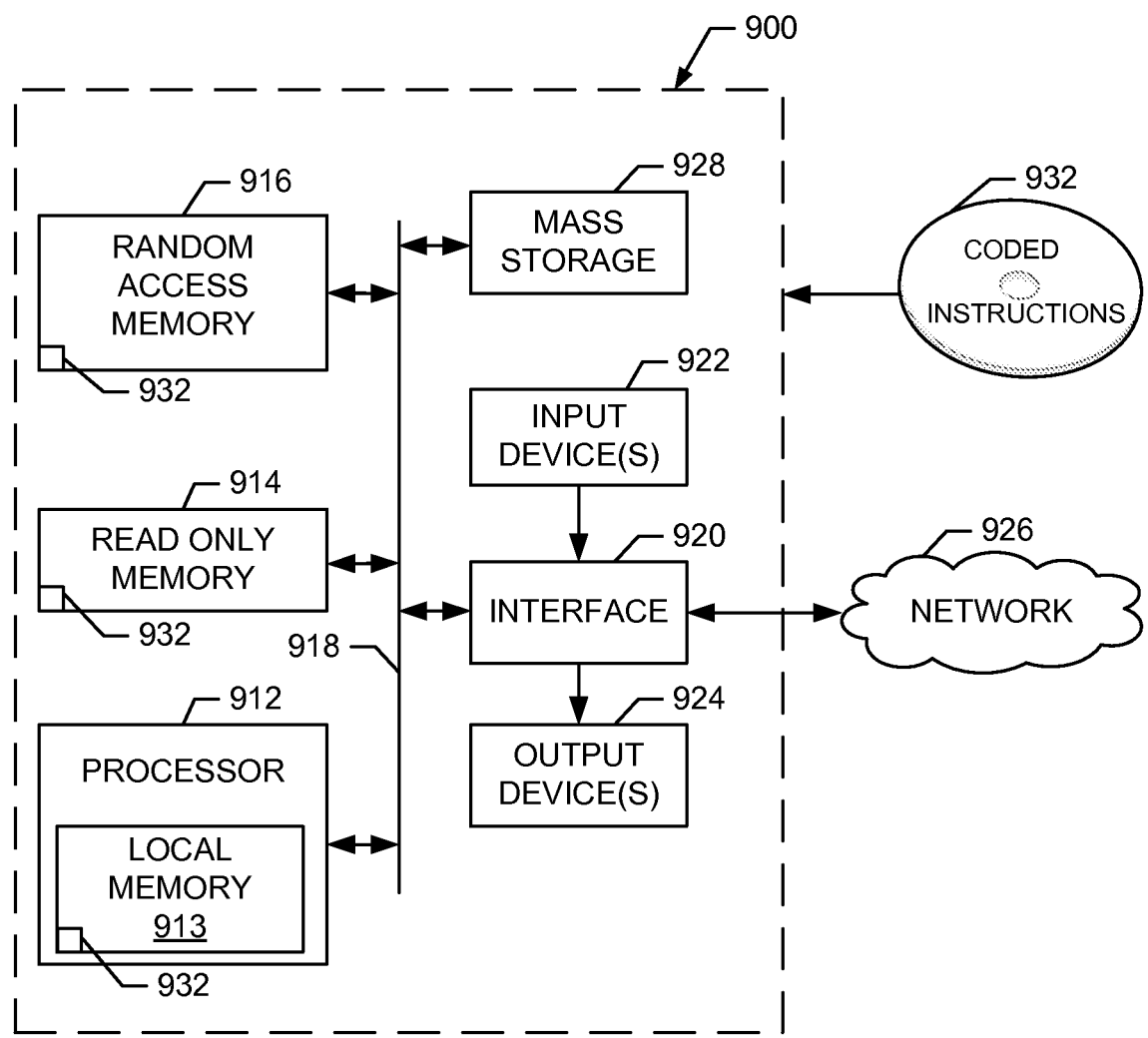
FIG. 9 is a block diagram of an example computer capable of executing the instructions of FIGS. 5, 6, 7 and/or 8 to implement the apparatus of FIGS. 1, 2, and/or 3.

FIG. 9 is a block diagram of an example computer 900 capable of executing the instructions 500, 600, 700, 800 of FIGS. 5, 6, 7 and 8 to implement the apparatus of FIGS. 1-3. The computer 900 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 900 of the instant example includes a processor 912. For example, the processor 912 can be implemented by one or more microprocessors or controllers from any desired family or manufacturer.

The processor 912 includes a local memory 913 (e.g., a cache) and is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The computer 900 also includes an interface circuit 920. The interface circuit 920 may be implemented by any type of interface standard, such as an Ethernet interface, a universal serial bus (USB), and/or a PCI express interface.

One or more input devices 922 are connected to the interface circuit 920. The input device(s) 922 permit a user to enter data and commands into the processor 912. The input device(s) can be implemented by, for example, a keyboard, a mouse, a touchscreen, a track-pad, a trackball, isopoint and/or a voice recognition system.

One or more output devices 924 are also connected to the interface circuit 920. The output devices 924 can be implemented, for example, by display devices (e.g., a liquid crystal display, a cathode ray tube display (CRT), a printer and/or speakers). The interface circuit 920, thus, typically includes a graphics driver card.

The interface circuit 920 also includes a communication device (e.g., wireless interface 124) such as a modem or network interface card to facilitate exchange of data with external computers via a network 926 (e.g., an Ethernet connection, a digital subscriber line (DSL), a telephone line, coaxial cable, a cellular telephone system, etc.).

The computer 900 also includes one or more mass storage devices 928 for storing software and data. Examples of such mass storage devices 928 include floppy disk drives, hard drive disks, compact disk drives and digital versatile disk (DVD) drives. The mass storage device 928 may implement the storage devices 114, 306 of FIGS. 1 and 3.

The coded instructions 932 of FIGS. 5, 6, 7, and 8 may be stored in the mass storage device 928, in the volatile memory 914, in the non-volatile memory 916, and/or on a removable storage medium such as a CD or DVD.

From the foregoing, it will be appreciated that example systems, methods, apparatus, and articles of manufacture have been disclosed which may be used to obtain mobile device usage information from a variety of mobile device types. Further, example systems, methods, apparatus, and articles of manufacture disclosed herein may be implemented on different types of mobile devices running the same type of operating system by providing the mobile devices with a similar or identical software package, thereby reducing development and/or distribution costs, and decreasing invasiveness relative to known monitoring solutions. Example systems, methods, apparatus, and articles of manufacture disclosed herein may additionally or alternatively be used to collect usage information from mobile devices provided with different operating systems.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to determine usage of a device, comprising:
   filtering, via a first application executed by a processor, a public debug log file stored in the device to obtain debug messages that are stored in the public debug log file by a plurality of second applications executed by the processor and representative of device usage information, the public debug log file including messages associated with performance of the second applications and the device, the public debug log file being included on the device to store messages and information for reviewing performance of the device and the second applications, the filtering of the public debug log file including:
   identifying an application title or a service title in a first one of the debug messages in the public debug log file;
   determining whether the first one of the debug messages is a message of interest based on the application title or the service title;
   identifying at least one of a uniform resource identifier or a uniform resource locator in a second one of the debug messages in the public debug log file; and
   determining whether the second one of the debug messages is a message of interest based on the content of the uniform resource identifier or the uniform resource locator; and
   sending, to an audience measurement entity server, a filtered log file based on the filtering of the public debug log file.

2. A method as defined in claim 1, wherein the sending of the filtered log file includes sending information representative of a multimedia event or information representative of an advertisement sent to the device.

3. A method as defined in claim 1, wherein the filtering of the public debug log file comprises generating the filtered log file from the public debug log file.

4. A method as defined in claim 3, wherein the filtered debug log file comprises usage information.

5. A method as defined in claim 3, wherein generating the filtered log file is in response to a threshold amount of time lapsing.

6. A method as defined in claim 3, wherein the filtering of the public debug log file comprises updating the filtered log file from the public debug log file.

7. A method as defined in claim 6, wherein the device is a mobile device and the filtering is done by the first application on the mobile device.

8. A mobile device, comprising:
   a log filter to generate a filtered log file from a public debug log file stored in the mobile device to obtain debug messages that are stored in the public debug log file by applications and operating system services executed by the mobile device and that are representative of mobile device usage information, the public debug log file comprising messages associated with performance of the applications and the operating system services, the public debug log file being included on the device to store messages and information for reviewing performance of the mobile device and the applications, the log filter to generate the filtered log file by:
   identifying an application title or a service title in a first one of the debug messages in the public debug log file;
   determining whether the first one of the debug messages is a first message of interest based on the application title or the service title;
   identifying at least one of a uniform resource identifier or a uniform resource locator in a second one of the debug messages in the public debug log file; and
   determining whether the second one of the debug messages is a second message of interest based on the content of the uniform resource identifier or the uniform resource locator; and
   a filtered log reporter to send, to an audience measurement entity server, the filtered log file.

9. A mobile device as defined in claim 8, wherein the log filter is to generate the filtered log file by determining whether a debug message in the public debug log file is associated with a monitored one of the applications and operating system services.

10. A tangible article of manufacture comprising machine readable instructions which, when executed, cause a processor to at least:
    execute a first device application to filter a public debug log file stored in a device housing the processor to obtain debug messages that are stored in the public debug log file by second applications executed by the processor, the debug messages being representative of usage information, the public debug log file including messages associated with performance of the second applications and the device, the public debug log file being included on the device to store messages and information for reviewing performance of the device and the second applications, the instructions to cause the processor to filter the public debug log file by:
    identifying an application title or a service title in a first one of the debug messages in the public debug log file;
    determining whether the first one of the debug messages is the message of interest based on the application title or the service title;
    identifying at least one of a uniform resource identifier or a uniform resource locator in a second one of the debug messages in the public debug log file; and
    determining whether the second one of the debug messages is a message of interest based on the content of the uniform resource identifier or the uniform resource locator; and
    export, to an audience measurement entity server, a filtered log file generated by the first device application filtering the public debug log file.

11. An article of manufacture as defined in claim 10, wherein the instructions are to cause the processor to export the filtered log file by exporting information representative of a multimedia event or information representative of an advertisement sent to the device.

12. An article of manufacture as defined in claim 10, wherein the instructions are to cause the processor to filter the public debug log file by generating the filtered log file from the public debug log file.

13. An article of manufacture as defined in claim 12, wherein the filtered log file comprises usage information.

14. An article of manufacture as defined in claim 13, wherein the usage information comprises at least one of a timestamp, an application name, a service name, an informational message, a uniform resource locator, or a uniform resource identifier.

15. An article of manufacture as defined in claim 12, wherein the instructions are to cause the processor to generate the filtered log file in response to a threshold amount of time lapsing.

16. An article of manufacture as defined in claim 10, wherein the instructions are to cause the processor to decrypt a debug log message to determine usage information.

17. An article of manufacture as defined in claim 10, wherein the instructions are to cause the processor to filter the public debug log file by updating the filtered log file from the public debug log file.

18. A method as defined in claim 1, wherein filtering the debug log file comprises identifying debug messages in the debug log file that include an identification of media presented via the device.

19. A method as defined in claim 1, wherein the filtered log file comprises debug messages stored in the public debug log file that identify media presented via the device.

20. A method as defined in claim 2, wherein the multimedia event is at least one of an audio event, a video event, or an audio/video event.

21. A method as defined in claim 1, wherein filtering the public debug log file comprises identifying the ones of the debug messages that are assigned a DEBUG priority level.

22. A method as defined in claim 1, wherein the second applications comprise at least one of a video application, a game application, a web browser application, or an operating system.

23. A method as defined in claim 1, further comprising installing the first application on the device when an audience measurement panelist associated with the device has agreed to have activities occurring on the device monitored.

* * * * *